(12) United States Patent
Akiyama et al.

(10) Patent No.: US 10,823,688 B2
(45) Date of Patent: Nov. 3, 2020

(54) RADIATION DETECTION DEVICE

(71) Applicant: HORIBA, Ltd., Kyoto-shi, Kyoto (JP)

(72) Inventors: Hisashi Akiyama, Kyoto (JP); Kusuo Ueno, Kyoto (JP); Takeshi Akamatsu, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 16/468,731

(22) PCT Filed: Nov. 28, 2017

(86) PCT No.: PCT/JP2017/042502
§ 371 (c)(1),
(2) Date: Jun. 12, 2019

(87) PCT Pub. No.: WO2018/110265
PCT Pub. Date: Jun. 21, 2018

(65) Prior Publication Data
US 2019/0317032 A1    Oct. 17, 2019

(30) Foreign Application Priority Data

Dec. 15, 2016  (JP) .................................. 2016-242915

(51) Int. Cl.
*G01N 23/2252*  (2018.01)
*G01N 23/223*   (2006.01)
*G01N 23/2204*  (2018.01)

(52) U.S. Cl.
CPC ....... *G01N 23/223* (2013.01); *G01N 23/2204* (2013.01); *G01N 2223/076* (2013.01)

(58) Field of Classification Search
None
See application file for complete search history.

(56) References Cited

U.S. PATENT DOCUMENTS 8,440,986 B2 *  5/2013  Gofron ................ G01N 23/223
                                                  250/461.1
2003/0169504 A1   9/2003  Kaminsky et al.
(Continued)

FOREIGN PATENT DOCUMENTS

JP    H04213047 A      8/1992
JP    2000329713 A    11/2000
(Continued)

OTHER PUBLICATIONS

International Search Report dated Feb. 20, 2018 for PCT/JP2017/042502 and English translation.
(Continued)

*Primary Examiner* — Hoon K Song
(74) *Attorney, Agent, or Firm* — Lucas & Mercanti, LLP

(57) ABSTRACT

The radiation detection device is equipped with a sample holding unit; an irradiation unit for irradiating a sample held on the sample holding unit with radiations; a detection unit for detecting the radiations generated from the sample; an illumination unit for irradiating the sample with light; an observation unit for observing the sample; and a light transmitting plate for allowing the light from the illumination unit, with which the sample held on the sample holding unit is irradiated, to be transmitted therethrough. The light transmitting plate is disposed at a position between the sample holding unit and the irradiation unit, and has an opening portion for allowing the radiations from the irradiation unit, with which the sample is irradiated, to pass therethrough and a scattering portion for scattering light.

7 Claims, 8 Drawing Sheets

(56) References Cited

U.S. PATENT DOCUMENTS

| | | | | |
|---|---|---|---|---|
| 2004/0109534 A1* | 6/2004 | Uehara | ............... | G21K 1/06 |
| | | | | 378/84 |
| 2009/0190722 A1* | 7/2009 | Windt | ............... | A61B 6/4078 |
| | | | | 378/206 |
| 2013/0168570 A1* | 7/2013 | Wendler | ............... | A61B 6/5247 |
| | | | | 250/395 |
| 2015/0362639 A1* | 12/2015 | Rossiger | ............... | G01N 23/223 |
| | | | | 378/50 |

FOREIGN PATENT DOCUMENTS

| | | | |
|---|---|---|---|
| JP | 2004093513 | A | 3/2004 |
| JP | 2004163235 | A | 6/2004 |
| JP | 4073277 | B2 | 4/2008 |
| JP | 2009025262 | A | 2/2009 |
| JP | 2016509231 | A | 3/2016 |

OTHER PUBLICATIONS

EPO, Extended European Search Report for the corresponding European patent application No. 17881562.7, dated Jul. 16, 2020.

\* cited by examiner

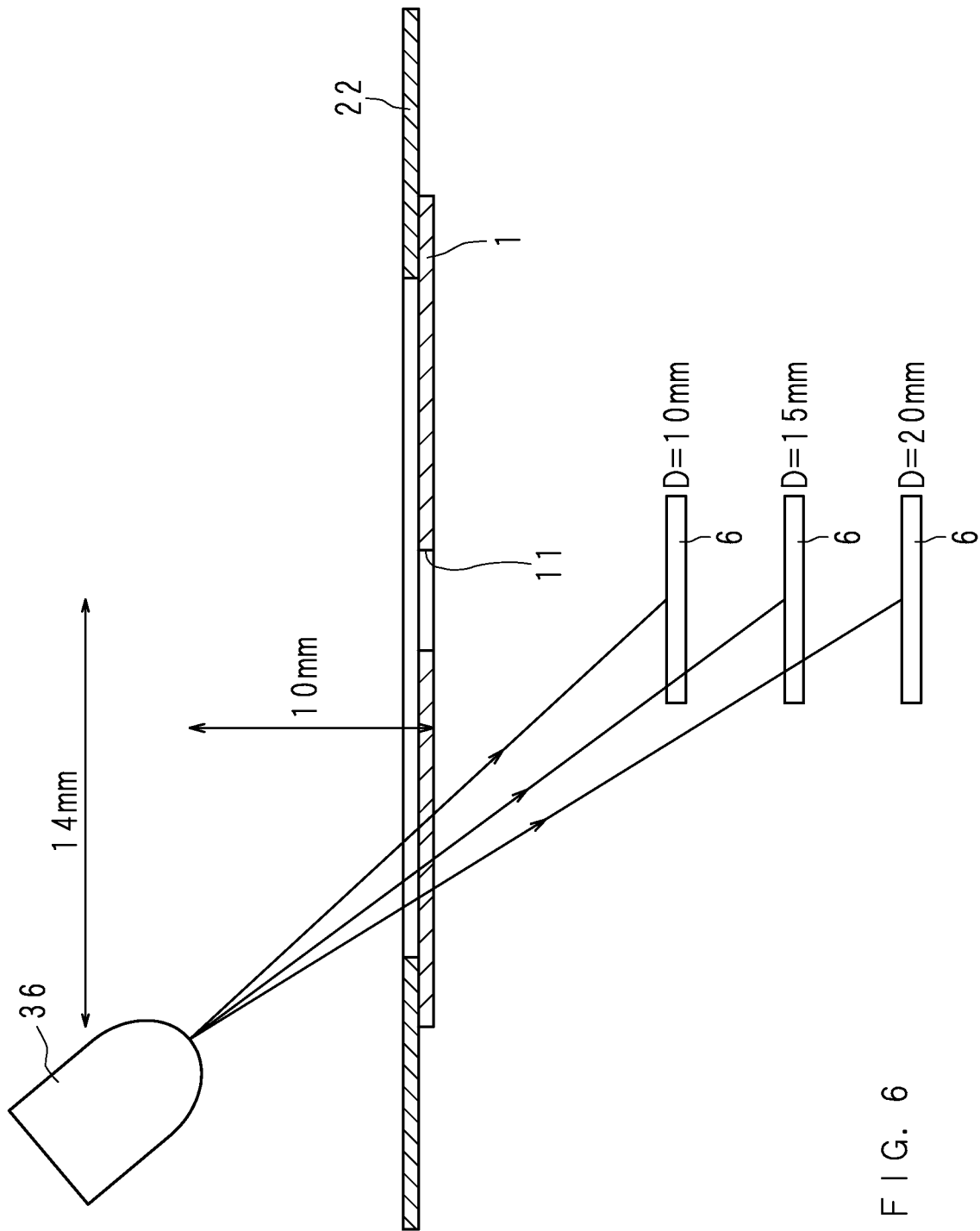
F I G. 6

RADIATION DETECTION DEVICE

CROSS REFERENCE TO RELATED APPLICATION

This Application is a 371 of PCT/JP2017/042502 filed on Nov. 28, 2017, which, in turn, claimed the priority of Japanese Patent Application No. 2016-242915 filed on Dec. 15, 2016, both applications are incorporated herein by reference.

FIELD

The present invention relates to a radiation detection device for observing a sample, for irradiating the sample with radiations, and for detecting radiations generated from the sample.

BACKGROUND

X-ray analysis is a method for irradiating a sample with radiations, such as electron beams or X-rays, for detecting the characteristic X-rays generated from the sample, and for analyzing components contained in the sample from the spectrum of the characteristic X-rays. As an example of X-ray analysis, fluorescent X-ray analysis is available in which X-rays are used as radiations with which the sample is irradiated. An X-ray detection device for use in X-ray analysis is equipped with a radiation source for generating radiations with which the sample is irradiated and a detection unit for detecting the characteristic X-rays generated from the sample. Furthermore, the X-ray detection device is equipped with a light source with which the sample is illuminated and an optical microscope in order to observe the sample.

Japanese Patent No. 4073277 discloses an X-ray detection device in which a sample is disposed outside a vacuum chamber. In this X-ray detection device, a transmitting film through which radiations are transmitted is provided in the vacuum chamber, and the sample is irradiated with the radiations from the inside of the vacuum chamber through the transmitting film. Moreover, Japanese Patent No. 4073277 also discloses that the sample is illuminated from the inside of the vacuum chamber in order to photograph the sample.

SUMMARY

In order that the sample is illuminated from the inside of the vacuum chamber, the area of the wall of the vacuum chamber through which the light with which the sample is illuminated passes is required to be made large to some extent. However, in the case that the transmitting film provided in the vacuum chamber is too large in size, the transmitting film lacks in durability for maintaining vacuum, whereby the transmitting film cannot be made large in size. Hence, a light transmitting plate made of a light transmitting material is disposed around the transmitting film and the sample is illuminated through the light transmitting plate. However, shadows may sometimes be generated due to the boundary between the transmitting film and the light transmitting plate. Furthermore, in the case that a sample having an uneven surface is irradiated with light, shadows are also generated. As described above, the X-ray detection device has a problem that it is difficult to uniformly illuminate the sample and it is also difficult to stably observe the sample.

The present disclosure has been made in consideration of these circumstances, and an object is to provide a radiation detection device in which a sample can be observed stably by making the sample to be illuminated as uniformly as possible.

A radiation detection device according to an aspect of the present disclosure comprises a sample holding unit, an irradiation unit for irradiating a sample held on the sample holding unit with radiations, a detection unit for detecting the radiations generated from the sample, an illumination unit for irradiating the sample with light, and an observation unit for observing the sample. The radiation detection device is characterized by comprising a light transmitting plate for allowing the light from the illumination unit, with which the sample held on the sample holding unit is irradiated, to be transmitted therethrough, wherein the light transmitting plate is disposed at a position between the sample holding unit and the irradiation unit, and the light transmitting plate includes: an opening portion for allowing the radiations from the irradiation unit, with which the sample is irradiated, to pass therethrough; and a scattering portion for scattering light.

In the radiation detection device according to an aspect of the present disclosure, the sample holding unit, the illumination unit and the light transmitting plate are disposed so that the light from the illumination unit does not pass through the opening portion.

In the radiation detection device according to an aspect of the present disclosure, the illumination unit is disposed with respect to the light transmitting plate so that the sample held on the sample holding unit at a position away from the light transmitting plate by a predetermined distance or more is positioned outside an imaginary cone that is formed by the extension lines of the lines connecting the center of the light emitting portion of the illumination unit to the edges of the opening portion.

In the radiation detection device according to an aspect of the present disclosure, the edges of the opening portion do not scatter light.

In the radiation detection device according to an aspect of the present disclosure, the portion of the light transmitting plate through which light is allowed to be transmitted is sand blasted.

The radiation detection device according to an aspect of the present disclosure is characterized by further comprising a changing unit for changing the distance between the sample holding unit and the light transmitting plate.

The radiation detection device according to an aspect of the present disclosure is characterized by further comprising a vacuum chamber, wherein at least part of each of the irradiation unit, the detection unit and the illumination unit is disposed inside the vacuum chamber, the light transmitting plate is part of the wall of the vacuum chamber, and the sample holding unit is disposed outside the vacuum chamber.

In an aspect of the present disclosure, the radiation detection device is equipped with the light transmitting plate for allowing the light from the illumination unit, with which the sample held on the sample holding unit is irradiated, to be transmitted therethrough. The light transmitting plate has an opening portion for allowing the radiations from the irradiation unit, with which the sample is irradiated, to pass therethrough and a scattering portion for scattering light. The sample is irradiated with the light that is scattered when the light is transmitted through the scattering portion, whereby the sample can be observed. Since the sample is irradiated with the scattered light, shadows are hardly generated on the surface of the sample, whereby the sample is illuminated as uniformly as possible.

In an aspect of the present disclosure, the light with which the sample is irradiated does not pass through the opening portion of the light transmitting plate. Shadows due to the edges of the opening portion are not generated, and the sample is illuminated as uniformly as possible.

In an aspect of the present disclosure, the illumination unit is disposed so that the sample is positioned outside the imaginary cone that is formed by the extension lines of the lines connecting the center of the light emitting portion of the illumination unit to the edges of the opening portion. Hence, the light with which the sample is irradiated does not pass through the opening portion of the light transmitting plate.

In an aspect of the present disclosure, the edges of the opening portion of the light transmitting plate do not scatter light. A gradation in brightness on the sample due to enhancement of the light passing through the edges of the opening portion is eliminated, whereby such a gradation in brightness on the sample is hardly generated.

In an aspect of the present disclosure, since the light transmitting plate is sand blasted, the light transmitted through the light transmitting plate is scattered.

In an aspect of the present disclosure, the radiation detection device can change the distance between the sample holding unit and the light transmitting plate. Even in the case that the distance between the sample and the light transmitting plate is changed, since the sample is irradiated with the scattered light, the observed image of the sample is hardly changed.

In an aspect of the present disclosure, the light transmitting plate is part of the wall of the vacuum chamber, and the sample holding unit is disposed outside the vacuum chamber. The sample disposed outside the vacuum chamber is irradiated with radiations from the inside of the vacuum chamber, and the radiations generated from the sample are detected in the inside of the vacuum chamber.

In an aspect of the present disclosure, the radiation detection device exhibits excellent effects such that the sample can be illuminated as uniformly as possible and the sample can be observed with stable brightness.

The above and further objects and features will more fully be apparent from the following detailed description with accompanying drawings.

BRIEF DESCRIPTION OF DRAWINGS

FIG. 6 is a schematic view showing a second example of a specific arrangement of the light source and the light transmitting plate;

DETAILED DESCRIPTION

The present disclosure will be described below specifically on the basis of the drawings showing the embodiments thereof.

Embodiment 1

Figure 1:
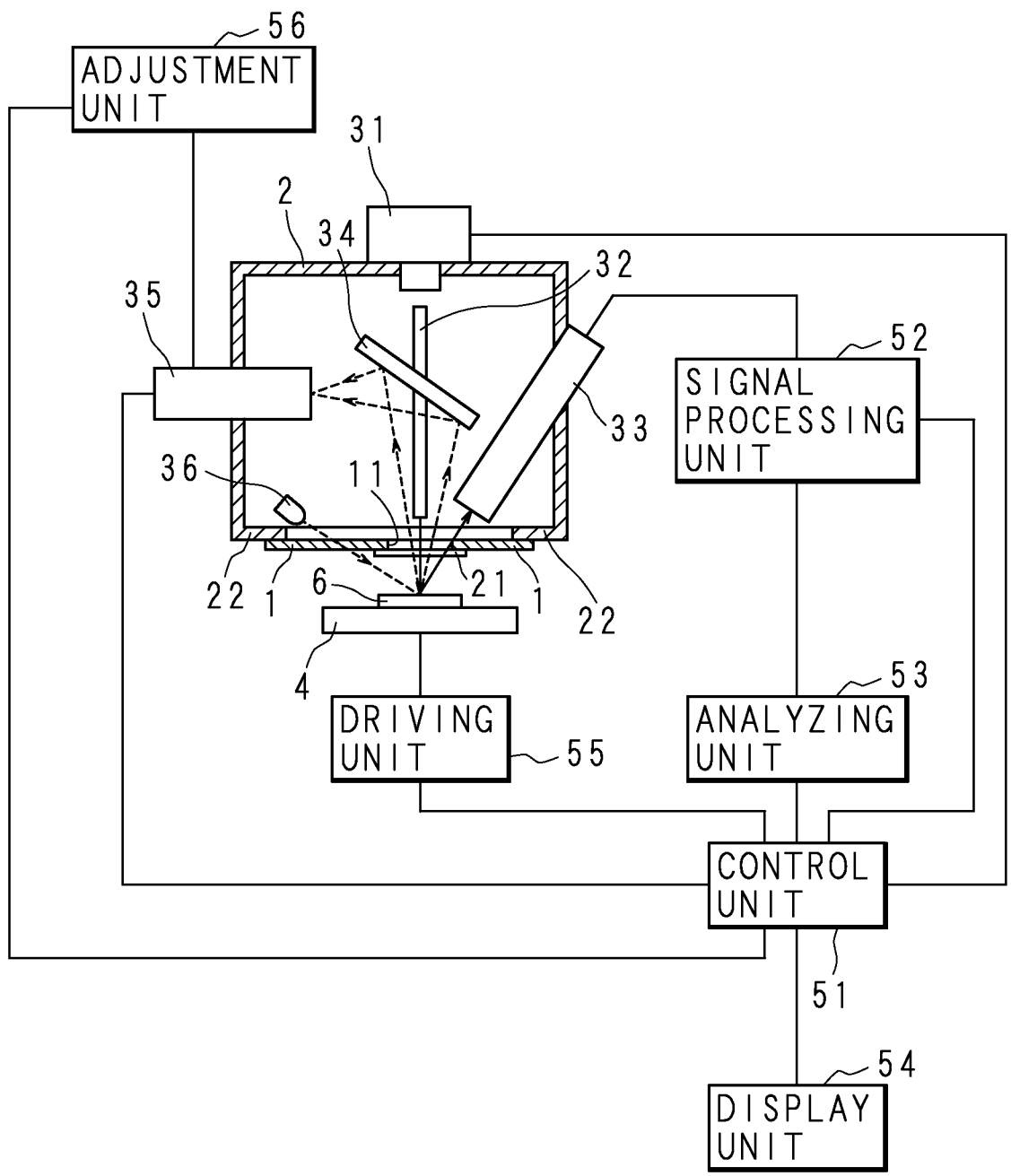
FIG. 1 is a block diagram showing a configuration of an X-ray detection device.

FIG. 1 is a block diagram showing a configuration of an X-ray detection device. The X-ray detection device is a fluorescent X-ray analyzer and corresponds to a radiation detection device. The X-ray detection device is equipped with a sample holding unit 4 for holding a sample 6; an X-ray source 31 for emitting X-rays; an X-ray optical element 32 for guiding X-rays so that the sample 6 is irradiated with the X-rays emitted from the X-ray source 31; and a detection unit 33 for detecting fluorescent X-rays generated from the sample 6. The sample holding unit 4 is, for example, a sample table on which the sample 6 is placed. The sample holding unit 4 may hold the sample 6 using a method other than placing the sample. The X-ray source 31 is, for example, an X-ray tube. The X-ray optical element 32 is, for example, a mono-capillary lens using an X-ray guide tube that guides incident X-rays while reflecting the X-rays inside the guide tube or a poly-capillary lens using a plurality of X-ray guide tubes. The X-ray source 31 and the X-ray optical element 32 correspond to an irradiation unit. The detection unit 33 outputs a signal proportional to the energy of the detected fluorescent X-rays. The X-ray source 31 emits the X-rays, the X-ray optical element 32 converges the X-rays on the sample 6 held on the sample holding unit 4, the sample 6 is irradiated with the X-rays, the fluorescent X-rays are generated from the sample 6, and the fluorescent X-rays are detected by the detection unit 33. In FIG. 1, the X-rays with which the sample 6 is irradiated and the fluorescent X-rays are indicated by solid arrows.

Furthermore, the X-ray detection device is equipped with a light source 36 with which the sample 6 is illuminated, a mirror 34, an optical microscope 35, and an adjustment unit 56 for adjusting the focal position of the optical microscope 35. The light source 36 corresponds to an illumination unit with which the sample 6 held on the sample holding unit 4 is irradiated. The light source 36 emits visible light. The light source 36 is, for example, an LED (light-emitting diode). The X-ray detection device may be equipped with a plurality of light sources 36. The light with which the sample 6 is irradiated is reflected by the sample 6. The mirror 34 reflects the light reflected by the sample 6, thereby making the light incident onto the optical microscope 35. The optical microscope 35 has an image sensor. The optical microscope 35 detects the incident light and photographs the sample 6. The optical microscope 35 corresponds to an observation unit. The adjustment unit 56 is connected to the optical microscope 35. By moving the optical microscope 35, the adjustment unit 56 adjusts the focal position of the optical microscope 35 so that the optical microscope 35 focuses on the sample 6. The adjustment unit 56 may also adjust the focal position by adjusting the optical system inside the optical microscope 35. The X-ray detection device may be further equipped with an optical system such as a lens. In FIG. 1, light is indicated by broken arrows. The X-ray detection device may also be formed so as to be able to observe the sample 6 using infrared rays or near infrared rays. In this form, the sample 6 is irradiated with infrared rays or near infrared rays by the illumination unit, and the observation unit photographs the sample 6 using the infrared rays or near infrared rays. Moreover, the observation unit may also be an optical apparatus through which the user observes the sample 6 by directly viewing the apparatus.

What's more, the X-ray detection device is equipped with a vacuum chamber 2. The cross section of the vacuum chamber 2 is shown in FIG. 1. Part of the wall of the vacuum chamber 2 is configured so as to include a plate-shaped frame 22 and a light transmitting plate 1 for transmitting light. The frame 22 has an opening part, and the light transmitting plate 1 is disposed at a position where the opening part of the frame 22 is closed. The light transmitting plate 1 is formed of a light transmitting resin, such as polycarbonate, ABS (acrylonitrile butadiene styrene) or POM (polyoxymethylene), or formed of glass. The frame 22 is formed of a material, such as aluminum, having strength higher than that of the light transmitting plate 1. The light transmitting plate 1 has an opening portion 11. An X-ray transmitting film 21 is stretched so as to cover the opening portion 11. The X-ray transmitting film 21 transmits light and X-rays. The X-ray detection device is further equipped with an exhausting unit, not shown, for evacuating the interior of the vacuum chamber 2 in the state in which the X-ray transmitting film 21 is stretched.

At least part of each of the X-ray optical element 32, the detection unit 33, the mirror 34 and the light source 36 is disposed inside the vacuum chamber 2. Part or the whole of each of the X-ray source 31 and the optical microscope 35 may also be disposed inside the vacuum chamber 2 or may be disposed outside the vacuum chamber 2. The sample holding unit 4 is disposed outside the vacuum chamber 2 so as to be opposed to the outer surface of the light transmitting plate 1. The sample holding unit 4 holds the sample 6 so that part of the surface of the sample 6 is opposed to the opening portion 11. The light source 36 and the sample holding unit 4 are disposed so that the light from the light source 36 is transmitted through the light transmitting plate 1 and the sample 6 held on the sample holding unit 4 is irradiated with the light. The light source 36 may also be disposed at a non-vacuumed position. The mirror 34 and the optical microscope 35 are disposed so that the light reflected by the sample 6 passes through the opening portion 11 of the light transmitting plate 1, is reflected by the mirror 34, and then enters the optical microscope 35. Furthermore, the X-ray source 31, the X-ray optical element 32 and the detection unit 33 are disposed so that the X-rays from the X-ray source 31 pass through the opening portion 11 and the sample 6 is irradiated with the X-rays, and so that the fluorescent X-rays generated at the sample 6 pass through the opening portion 11 and enter the detection unit 33. The X-ray detection device may be formed so as not to be equipped with the X-ray optical element 32.

In the state in which the interior of the vacuum chamber 2 is kept vacuum, the X-ray source 31 emits X-rays, the X-rays pass through the opening portion 11 and the sample 6 is irradiated with the X-rays, and the fluorescent X-rays pass through the opening portion 11 and enter the detection unit 33, and then the fluorescent X-rays are detected at the detection unit 33. In the state in which the sample 6 is kept at atmospheric pressure, the fluorescent X-rays are detected. Hence, the handling of the sample 6 is simplified. Moreover, it is possible to detect the fluorescent X-rays even in the case that the sample 6 cannot be placed in a vacuumed state.

A signal processing unit 52 for processing the signal output from the detection unit 33 is connected to the detection unit 33. The signal processing unit 52 counts signals having various values output from the detection unit 33 and performs processing for obtaining the relationship between the energy of the detected fluorescent X-rays and the number of counts, that is to say, processing for generating the spectrum of the fluorescent X-rays. The signal processing unit 52 is connected to an analyzing unit 53. The analyzing unit 53 is configured so as to include an arithmetic section for performing arithmetic operations and a memory for storing data. The signal processing unit 52 outputs data indicating the generated spectrum to the analyzing unit 53. The data from the signal processing unit 52 is input to the analyzing unit 53, and the analyzing unit 53 performs qualitative analysis or quantitative analysis of elements contained in the sample 6 on the basis of the spectrum indicated by the input data. The X-ray detection device is equipped with a display unit 54, such as a liquid crystal display. The display unit 54 displays the image of the sample 6 photographed by the optical microscope 35. The user visually recognizes the image of the sample 6 displayed on the display unit 54, thereby being capable of observing the sample 6. A driving unit 55 for driving the sample holding unit 4 in a direction getting close to or away from the light transmitting plate 1 is connected to the sample holding unit 4. The driving unit 55 is configured, for example, using a stepping motor.

The X-ray source 31, the optical microscope 35, the signal processing unit 52, the analyzing unit 53, the display unit 54, the driving unit 55 and the adjustment unit 56 are connected to a control unit 51. The display unit 54 is connected to the optical microscope 35 via the control unit 51. The control unit 51 is composed of a computer including an arithmetic section and a memory. The control unit 51 controls the operations of the X-ray source 31, the signal processing unit 52, the analyzing unit 53, the display unit 54, the driving unit 55 and the adjustment unit 56. The driving unit 55 and the control unit 51 correspond to a changing unit. The control unit 51 may also be configured so as to receive instructions from the user and to control the various parts of the X-ray detection device in accordance with the received instructions. The display unit 54 may also display the spectrum generated by the signal processing unit 52 or the results of the analysis performed by the analyzing unit 53. Furthermore, the control unit 51 and the analyzing unit 53 may also be configured using the same computer.

Figure 2:
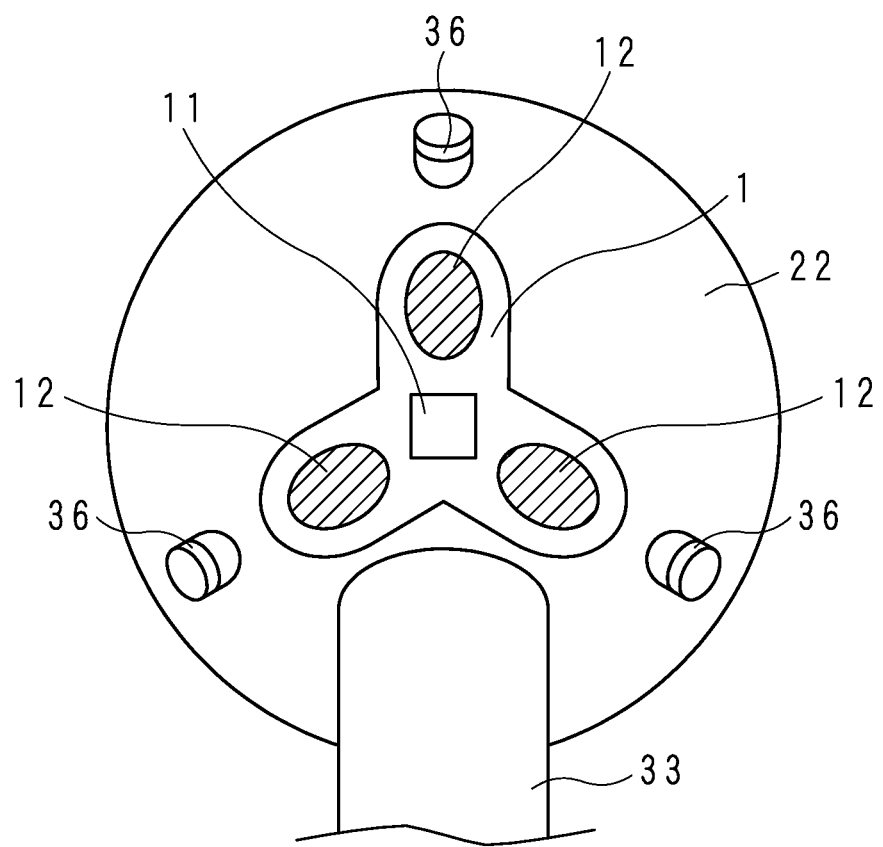
FIG. 2 is a plan view showing a first configuration example of the bottom section of a vacuum chamber.

The portion of the vacuum chamber 2, including the frame 22 and the light transmitting plate 1, is referred to as a bottom section. FIG. 2 is a plan view showing a first configuration example of the bottom section of the vacuum chamber 2. The opening portion 11 is provided at the center of the light transmitting plate 1 in a plan view. The frame 22 is disposed around the light transmitting plate 1. The light sources 36 are shown in the figure. The light sources 36 are disposed away from the bottom section of the vacuum chamber 2. FIG. 2 shows an example in which the X-ray detection device is provided with three light sources 36. The three light sources 36 are disposed around the line passing through the opening portion 11 and being orthogonal to the light transmitting plate 1 at nearly equal intervals. The respective light sources 36 are disposed so that the light transmitting plate 1 is irradiated with light. The light transmitting plate 1 is formed into a shape expanding in three directions around the opening portion 11 in a plan view so that the light transmitting plate 1 is irradiated with the light from the respective light sources 36 and has a small vacuum holding area. The light transmitting plate 1 has scattering portions 12 for scattering the light transmitted therethrough at the positions to be irradiated with the light from the light sources 36.

The scattering portion 12 is formed by sand blasting part of the light transmitting plate 1. The sand blasting may be performed on both the faces of the light transmitting plate 1 or may be performed on only one of the inner face and the outer face of the light transmitting plate 1. In the case that the sand blasting has been performed on the inner face of the light transmitting plate 1, the light from the light source 36 is hardly reflected by the surface of the light transmitting plate 1, whereby the hindrance of the observation of the sample 6 by the reflected light entering the optical microscope 35 is suppressed. Furthermore, the reduction in the light quantity due to the surface reflection is suppressed. Hence, it is desirable that the sand blasting should be performed on the inner face of the light transmitting plate 1. Moreover, the scattering portion 12 may also be formed using a method other than the sand blasting. For example, the scattering portion 12 may also be formed by a chemical surface treatment, such as etching, by surface grinding or by a process for forming unevenness on the surface. What's more, the scattering portion 12 may also be made of, for example, cloudy material or frosted glass.

Figure 3:
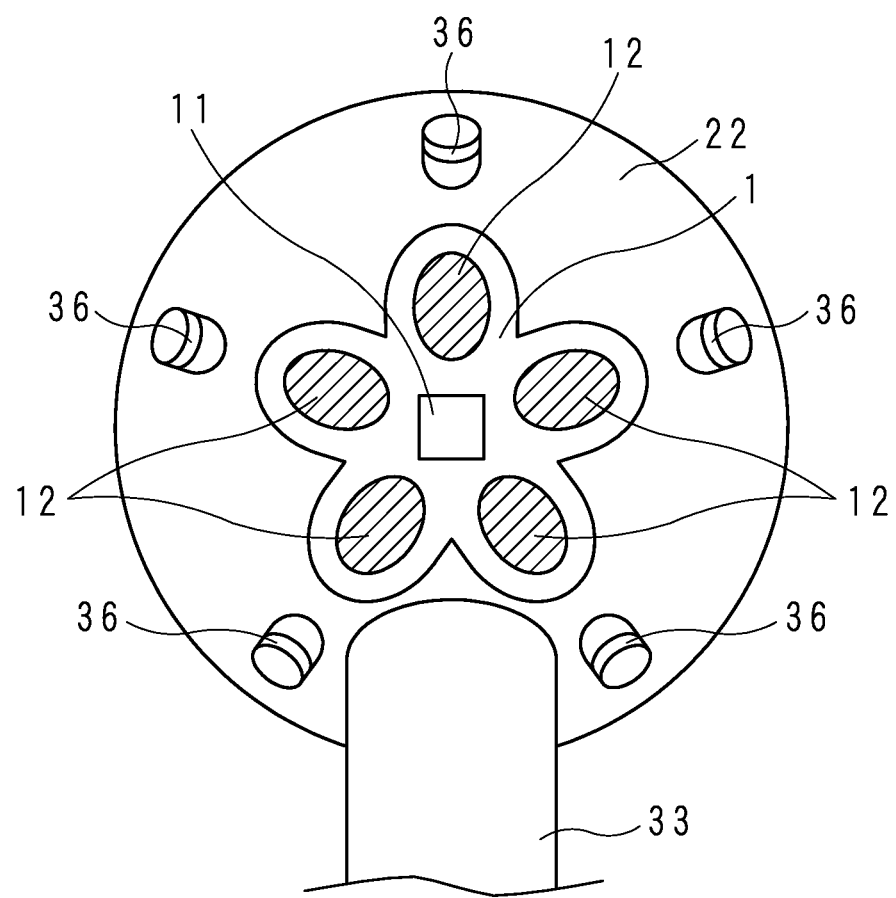
FIG. 3 is a plan view showing a second configuration example of the bottom section of the vacuum chamber.

FIG. 3 is a plan view showing a second configuration example of the bottom section of the vacuum chamber 2. The opening portion 11 is provided at the center of the light transmitting plate 1, and the frame 22 is disposed around the light transmitting plate 1. The light sources 36 are disposed away from the bottom section of the vacuum chamber 2. FIG. 3 shows an example in which the X-ray detection device is provided with five light sources 36. The five light sources 36 are disposed around the line passing through the opening portion 11 and being orthogonal to the light transmitting plate 1 at nearly equal intervals. The respective light sources 36 are disposed so that the light transmitting plate 1 is irradiated with light. The light transmitting plate 1 is formed into a shape expanding in five directions around the opening portion 11 in a plan view so that the light transmitting plate 1 is irradiated with the light from the respective light sources 36 and has a small vacuum holding area. The light transmitting plate 1 has scattering portions 12 for scattering the light being transmitted therethrough at the positions to be irradiated with the light from the light sources 36. The X-ray detection device may also be equipped with one, two, four, six or more light sources 36.

Figure 4:
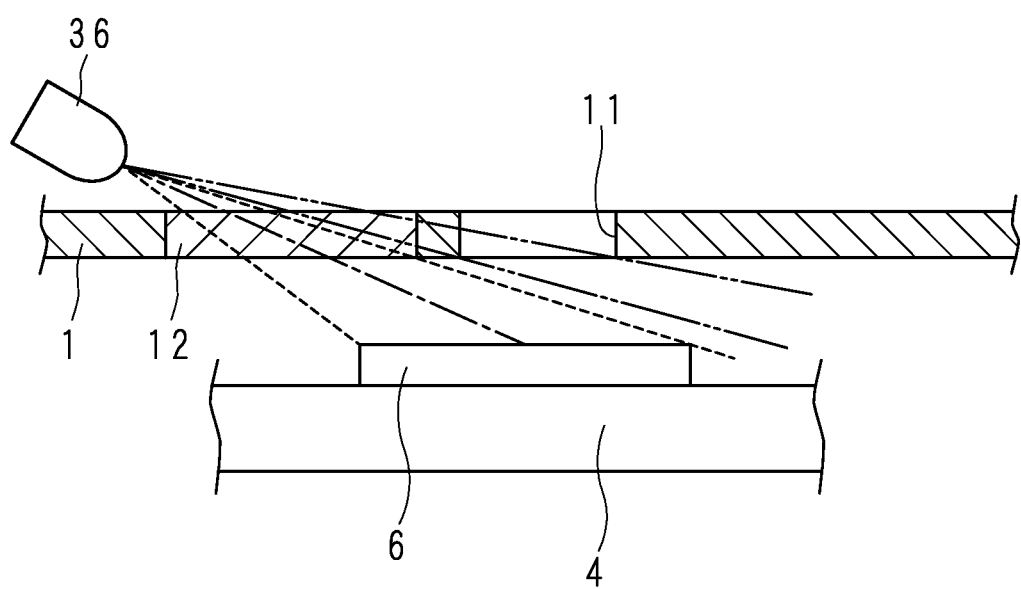
FIG. 4 is a schematic view showing a state in which a sample is irradiated with the light from a light source.

FIG. 4 is a schematic view showing a state in which the sample 6 is irradiated with the light from the light source 36. The cross section of the light transmitting plate 1 is shown in the figure, and the X-ray transmitting film 21 is not shown. The scattering portion 12 is irradiated with the light from the light source 36, and the light is scattered when transmitted through the scattering portion 12. The sample 6 is irradiated with the light scattered at the scattering portion 12. Since the sample 6 is irradiated with the light scattered at the scattering portion 12, the sample 6 is uniformly illuminated. Even in the case that the sample 6 has an uneven surface, since the sample 6 is irradiated with the scattered light, shadows are hardly generated on the surface of the sample 6, and the sample 6 is illuminated almost uniformly. In addition, since the sample 6 is irradiated with the light in a plurality of directions from a plurality of light sources 36, shadows are hardly generated on the surface of the sample 6. Moreover, even in the case that a shadow is generated, the difference in brightness between the shadow and a portion other than the shadow becomes small, whereby the sample 6 is illuminated almost uniformly. Consequently, when the sample 6 is photographed with the optical microscope 35, the sample 6 can be illuminated as uniformly as possible, and the sample 6 can be observed with stable brightness.

Moreover, the light source 36 and the light transmitting plate 1 are disposed so that the light from the light source 36, with which the sample 6 is irradiated, does not pass through the opening portion 11. In the case that the sample 6 is irradiated with both the light having been transmitted through the light transmitting plate 1 and the light having passed through the opening portion 11, shadows are generated on the sample 6 by the light having passed through the edges of the opening portion 11. Since the light, with which the sample 6 is irradiated, does not pass through the opening portion 11, shadows due to the edges of the opening portion 11 are not generated. Hence, the sample 6 is illuminated as uniformly as possible.

More specifically, the light source 36 has directivity, and the light included in the light from the light source 36 and having 50% or more of the intensity of the light on the optical axis of the light source 36 does not pass through the opening portion 11. In the case that the light source 36 has directivity, the intensity of the light to be emitted is highest on the optical axis and becomes lower as the angle formed between the direction in which the light is emitted and the optical axis becomes larger. The angle formed between the direction in which the light having 50% of the intensity of the light on the optical axis is emitted and the optical axis is a predetermined angle depending on the light source 36. The position of the light source 36 with respect to the light transmitting plate 1 and the angle of the optical axis of the light source 36 with respect to the light transmitting plate 1 are determined so that the opening portion 11 is positioned on the outside of an imaginary cone that is drawn by the lines forming the predetermined angle with respect to the optical axis. In FIG. 4, the optical axis of the light source 36 is indicated by a dot-and-dash line and the lines forming the predetermined angle with respect to the optical axis are indicated by broken lines. Since the light source 36 and the light transmitting plate 1 are disposed as described above, the light having 50% or more of the intensity of the light on the optical axis of the light source 36 does not pass through the opening portion 11. The light having 50% or more of the intensity of the light on the optical axis of the light source 36 is mainly transmitted through the scattering portion 12, and the sample 6 is irradiated with the light. In this way, the light from the light source 36, with which the sample 6 is irradiated, substantially does not pass through the opening portion 11. The value of 50%, however, is taken as an example. The X-ray detection device may merely be configured so that the light having a predetermined ratio or more of the intensity of the light on the optical axis of the light source 36 does not pass through the opening portion 11. The predetermined ratio may be a value other than 50%, for example, 45% or 60%.

In the case that the distance between the outer face of the light transmitting plate 1 and the surface of the sample 6 held on the sample holding unit 4 is equal to or more than a predetermined distance, the arrangement position of the light source 36 with respect to the light transmitting plate 1 may be determined so that the sample 6 is positioned outside an imaginary cone that is formed by the extension lines of the lines connecting an emitting center of the light source 36 to the edges of the outer face of the opening portion 11. The emitting center is the center of the light emitting portion of light source 36. In FIG. 4, the imaginary cone is indicated by dashed-two dotted lines. The predetermined distance is, for example, 1 mm. Since the light source 36 is disposed with respect to the light transmitting plate 1 as described above, the light from the light source 36, with which the sample 6 is irradiated, does not pass through the opening portion 11. The X-ray detection device may also be formed so that, in the case that the distance between the outer face of the light transmitting plate 1 and the surface of the sample 6 held on the sample holding unit 4 is equal to or more than a predetermined distance, the arrangement position of the light source 36 with respect to the light transmitting plate 1 is determined so that the intersection point of the irradiation axis of the X-rays and the surface of the sample 6 is positioned outside the imaginary cone that is formed by the extension lines of the lines connecting the emitting center of the light source 36 to the edges of the outer face of the opening portion 11. The irradiation axis of the X-rays is the center axis of the X-rays with which the sample 6 is irradiated. In this form, the light applied to the position where the sample 6 to be irradiated with the X-rays having passed through the X-ray optical element 32 does not pass through the opening portion 11. Usually, when the sample 6 is photographed with the optical microscope 35, the portion to be irradiated with the X-rays on the sample 6 is photographed, whereby, also in this form, shadows are hardly generated in the image obtained by photographing the sample 6 with the optical microscope 35.

Furthermore, in the light transmitting plate 1, the scattering portion 12 is not formed at the edges of the opening portion 11. In the case that the scattering portion 12 is formed at the edges of the opening portion 11 by sand blasting or the like, the light passing through the edges of the opening portion 11 is enhanced and a gradation in brightness occurs on the sample 6. Since the scattering portion 12 is not formed at the edges of the opening portion 11, the gradation in brightness hardly occurs on the sample 6. Hence, the sample 6 is illuminated as uniformly as possible. Since the sample is illuminated uniformly, when the sample 6 is photographed with the optical microscope 35, the sample 6 can be observed with stable brightness. The X-ray detection device may also be formed so that the scattering portion 12 is also formed at the edges of the opening portion 11. Even in this form, the sample 6 can be illuminated uniformly with scattered light.

Moreover, as described above, the driving unit 55 drives the sample holding unit 4 in a direction getting close to or away from the light transmitting plate 1. In other words, the X-ray detection device can change the distance between the sample 6 held on the sample holding unit 4 and the light transmitting plate 1. In the case that the distance between the sample 6 and the light transmitting plate 1 is changed, the distance between the X-ray optical element 32 and the sample 6 is changed, whereby the size of the irradiation range of the X-rays to be converged onto the sample 6 by the X-ray optical element 32 is changed. The X-ray detection device can adjust the size of the range in which the sample 6 is irradiated with the X-rays by driving the sample holding unit 4. Conventionally, in the case that the distance between the sample 6 and the light transmitting plate 1 is changed differently, the angle of the light with which the sample is irradiated becomes different, whereby the image obtained by photographing the sample 6 with the optical microscope 35 becomes different. In particular, in the case that the sample 6 has an uneven surface, the shapes of the shadows generated on the sample 6 are changed depending on the difference in the distance between the sample 6 and the light transmitting plate 1, whereby the image of the sample 6 is changed.

In this embodiment, in any of a plurality of states in which the distance between the sample 6 and the light transmitting plate 1 is changed differently, the sample 6 is similarly irradiated with the light scattered by the scattering portion 12, and the image obtained by photographing the sample 6 with the optical microscope 35 is hardly changed. Furthermore, since the sample 6 is irradiated with the scattered light, shadows are hardly generated on the surface of the sample 6, whereby, even in the case that the sample 6 has an uneven surface, the change in the image of the sample 6 depending on the difference in the distance between the sample 6 and the light transmitting plate 1 hardly occurs. Consequently, in this embodiment, even in the case that the distance between the sample 6 and the light transmitting plate 1 is changed, the sample 6 can be observed stably.

Figure 5:
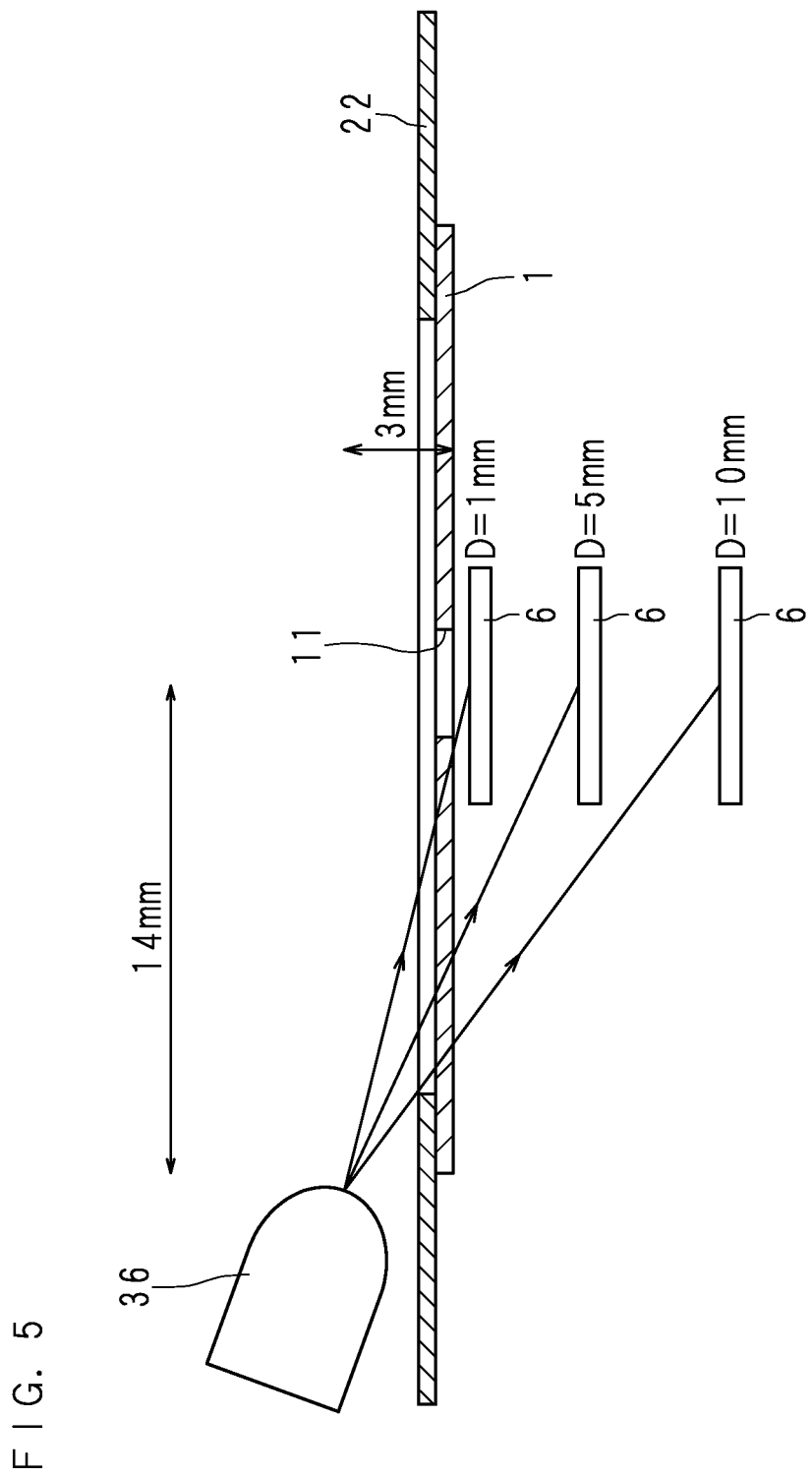
FIG. 5 is a schematic view showing a first example of a specific arrangement of the light source and a light transmitting plate.

FIG. 5 is a schematic view showing a first example of a specific arrangement of the light source 36 and the light transmitting plate 1. In the figure, the cross sections of the light transmitting plate 1 and the frame 22 are shown, and the X-ray transmitting film 21 is not shown. The distance from the center of the opening portion 11 to the emitting center of the light source 36 along the light transmitting plate 1 is 14 mm. The distance from the outer face of the light transmitting plate 1 to the emitting center of the light source 36 in the direction orthogonal to the light transmitting plate 1 is 3 mm. The angle formed between the optical axis of the light source 36 and the light transmitting plate 1 is 30°. In the figure, the states in the respective cases of the distance D from the surface of the sample 6 to the outer face of the light transmitting plate 1 being 1 mm, 5 mm and 10 mm are shown collectively. In this first example, the distance D from the surface of the sample 6 to the outer face of the light transmitting plate 1 is in a range of 1 to 10 mm and the sample 6 is irradiated with the light from the light source 36. In the figure, the light is indicated by solid arrows. More specifically, in the case that the distance D from the surface of the sample 6 to the outer face of the light transmitting plate 1 is in a range of 1 to 10 mm, the light from the light source 36 is transmitted through the light transmitting plate 1 without passing through the opening portion 11 and the light is applied onto the sample 6 at the position opposed to the center of the opening portion 11. In other words, in the X-ray detection device in which the light source 36 and the light transmitting plate 1 are arranged as shown in FIG. 5, in the case that the sample holding unit 4 holds the sample 6 at a position where the distance D from the surface of the sample 6 to the outer face of the light transmitting plate 1 is in the range of 1 to 10 mm, the sample 6 is illuminated uniformly.

FIG. 6 is a schematic view showing a second example of a specific arrangement of the light source 36 and the light transmitting plate 1. In the figure, the cross sections of the light transmitting plate 1 and the frame 22 are shown, and the X-ray transmitting film 21 is not shown. The distance from the center of the opening portion 11 to the emitting center of the light source 36 along the light transmitting plate 1 is 14 mm. The distance from the outer face of the light transmitting plate 1 to the emitting center of the light source 36 in the direction orthogonal to the light transmitting plate 1 is 10 mm. The angle formed between the optical axis of the light source 36 and the light transmitting plate 1 is 60°. In the figure, the states in the respective cases of the distance D from the surface of the sample 6 to the outer face of the light transmitting plate 1 being 10 mm, 15 mm and 20 mm are shown collectively. In this second example, the distance D from the surface of the sample 6 to the outer face of the light transmitting plate 1 is in a range of 10 to 20 mm and the sample 6 is irradiated with the light from the light source 36. In the figure, the light is indicated by solid arrows. More specifically, in the case that the distance D from the surface of the sample 6 to the outer face of the light transmitting plate 1 is in a range of 10 to 20 mm, the light from the light source 36 is transmitted through the light transmitting plate 1 without passing through the opening portion 11 and the light is applied onto the sample 6 at the position opposed to the center of the opening portion 11. In other words, in the X-ray detection device in which the light source 36 and the light transmitting plate 1 are arranged as shown in FIG. 6, in the case that the sample holding unit 4 holds the sample 6 at a position where the distance D from the surface of the sample 6 to the outer face of the light transmitting plate 1 is in the range of 10 to 20 mm, the sample 6 is illuminated uniformly.

Figure 7:
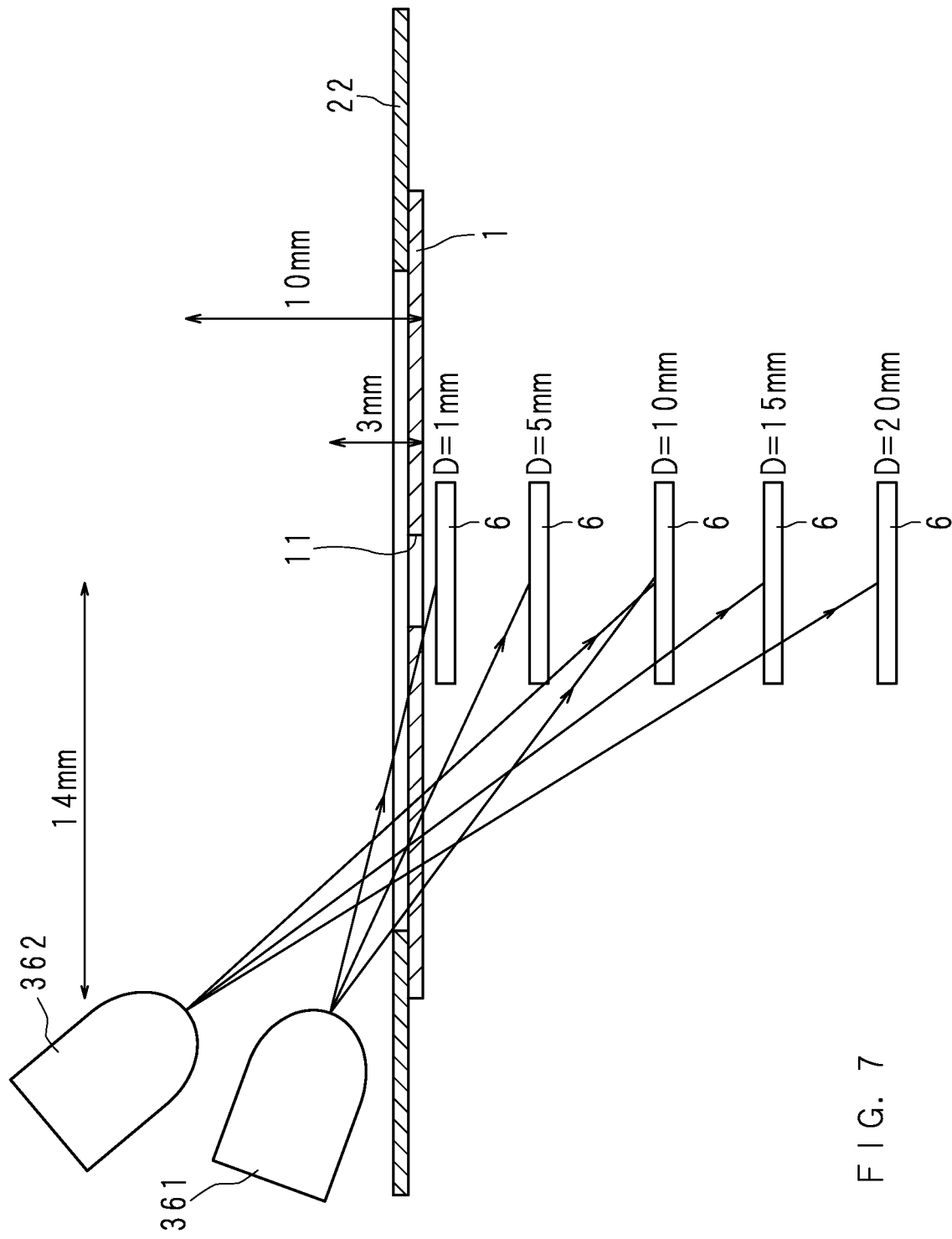
FIG. 7 is a schematic view showing a third example of a specific arrangement of the light source and the light transmitting plate.

FIG. 7 is a schematic view showing a third example of a specific arrangement of the light source 36 and the light transmitting plate 1. This third example is an example in which the first example and the second example are combined. In the third example, the X-ray detection device is equipped with a light source 361 having a distance of 3 mm to the outer face of the light transmitting plate 1 and a light source 362 having a distance of 10 mm to the outer face of the light transmitting plate 1. The angle formed between the optical axis of the light source 361 and the light transmitting plate 1 is 30°, and the angle formed between the optical axis of the light source 362 and the light transmitting plate 1 is 60°. In the figure, states in the respective cases of the distance D from the surface of the sample 6 to the outer face of the light transmitting plate 1 being 1 mm, 5 mm, 10 mm, 15 mm and 20 mm are shown collectively. In this third example, the distance D from the surface of the sample 6 to the outer face of the light transmitting plate 1 is in a range of 1 to 10 mm and the sample 6 is irradiated with the light from the light source 361. The distance D from the surface of the sample 6 to the outer face of the light transmitting plate 1 is in a range of 10 to 20 mm and the sample 6 is irradiated with the light from the light source 362. The X-ray detection device uses the light source 361 in the case that the distance D is in the range of 10 to 20 mm and uses the light source 362 in the case that the distance D is in the range of 10 to 20 mm, whereby the sample 6 can be illuminated uniformly while the distance between the sample 6 and the light transmitting plate 1 is changed in a wide range.

Embodiment 2

Figure 8:
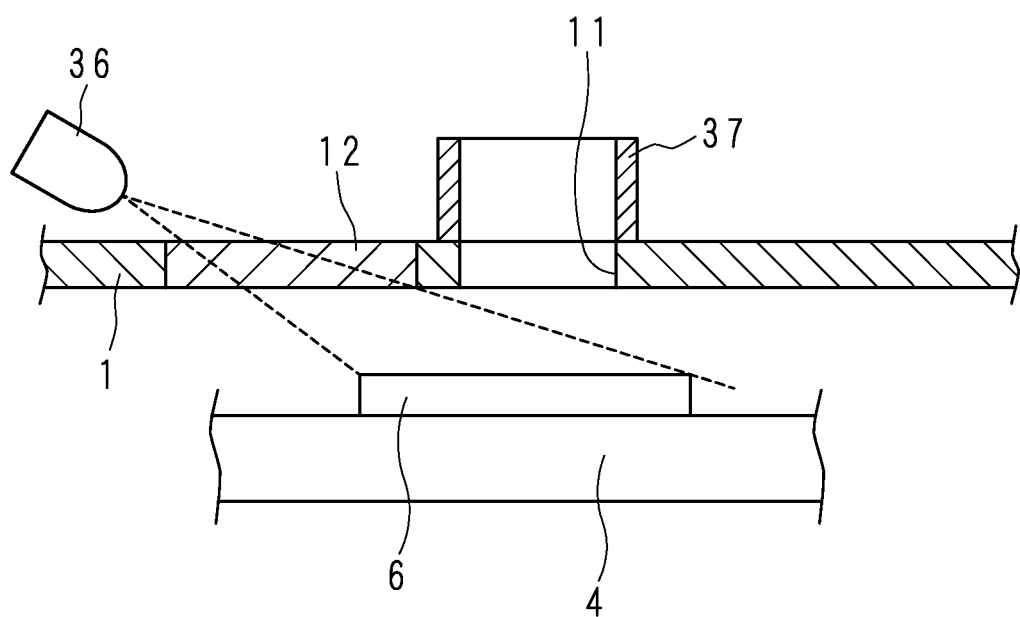
FIG. 8 is a schematic view showing part of a configuration of an X-ray detection device according to Embodiment 2.

FIG. 8 is a schematic view showing part of a configuration of an X-ray detection device according to Embodiment 2. The X-ray detection device is equipped with a light shielding part 37. The light shielding part 37 is made of a light shielding material and formed into a cylindrical shape. The inside diameter of the light shielding part 37 is equal to or more than the width of the opening portion 11. The light shielding part 37 is disposed so that one end thereof makes contact with the inner face of the light transmitting plate 1 and so as to enclose the opening portion 11 inside. The light shielding part 37 shields the light from the light source 36. The configurations of the other components of the X-ray detection device are similar to those in Embodiment 1. Since the light from the light source 36 is shielded by the light shielding part 37, the light from the light source 36 cannot enter the opening portion 11. Hence, the light from the light source 36, with which the sample 6 is irradiated, does not pass through the opening portion 11. Consequently, shadows due to the edges of the opening portion 11 are not generated on the sample 6. Also in this embodiment, when the sample 6 is photographed with the optical microscope 35, the sample 6 is illuminated as uniformly as possible, whereby the sample 6 can be observed with stable brightness. Furthermore, in this embodiment, even in the case that a light source 36 having a light distribution range wider than that in Embodiment 1 is used, since the light is shielded by the light shielding part 37, the light does not pass through the opening portion 11. Hence, it is possible to use the light source 36 having the light distribution range wider than that in Embodiment 1. The uniformity of the light with which the sample 6 is illuminated is enhanced further by using the light source 36 having the wide light distribution range.

In Embodiments 1 and 2 mentioned above, although the form in which part of the light transmitting plate 1 is used as the scattering portion 12 has been described, the X-ray detection device may have a form in which the whole of the light transmitting plate 1 is used as the scattering portion 12. Furthermore, in Embodiments 1 and 2, although the form in which the driving unit 55 drives the sample holding unit 4 in a direction getting close to or away from the light transmitting plate 1 has been described, the X-ray detection device may have a form in which the driving unit 55 can also drive the sample holding unit 4 in the direction along the light transmitting plate 1. Moreover, in Embodiments 1 and 2, although the energy distribution type form in which X-rays are separated by energy and then detected has been described, the X-ray detection device may have a wavelength distribution type form in which X-rays are separated by wavelength and then detected. What's more, in Embodiments 1 and 2, although the form in which the sample 6 is irradiated with X-rays and the fluorescent X-rays generated from the sample 6 are detected has been described, the X-ray detection device may also have a form in which the sample 6 is irradiated with radiations other than X-rays and then the characteristic X-rays generated from the sample 6 are detected. Still further, in Embodiments 1 and 2, although the form in which the radiation detection device is the X-ray detection device has been described, the radiation detection device may also have a form in which the detection unit 33 detects radiations other than X-rays. For example, the radiation detection device may also have a form in which the sample 6 is irradiated with electron beams and the secondary electrons or reflection electrons generated from the sample 6 are detected by the detection unit 33.

It is assumed that the embodiments disclosed this time are merely examples in all respects and not to be understood as limiting. The scope of the present invention is not defined by the above description, but by the appended claims, and includes all the changes within the meanings and ranges equivalent to the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:
1. A radiation detection device, comprising:
a sample holding unit;
an irradiation unit for irradiating a sample held on the sample holding unit with radiations;

a detection unit for detecting the radiations generated from the sample;

an illumination unit for irradiating the sample with light;

an observation unit for observing the sample; and a light transmitting plate for allowing the light from the illumination unit, with which the sample held on the sample holding unit is irradiated, to be transmitted therethrough, wherein the light transmitting plate is disposed at a position between the sample holding unit and the irradiation unit, and the light transmitting plate includes:

an opening portion for allowing the radiations from the irradiation unit, with which the sample is irradiated, to pass therethrough; and a scattering portion for scattering light.

2. The radiation detection device according to claim 1, wherein the sample holding unit, the illumination unit and the light transmitting plate are disposed so that the light from the illumination unit does not pass through the opening portion.

3. The radiation detection device according to claim 1, wherein the illumination unit is disposed with respect to the light transmitting plate so that the sample held on the sample holding unit at a position away from the light transmitting plate by a predetermined distance or more is positioned outside an imaginary cone that is formed by the extension lines of the lines connecting the center of the light emitting portion of the illumination unit to the edges of the opening portion.

4. The radiation detection device according to claim 1, wherein the edges of the opening portion do not scatter light.

5. The radiation detection device according to claim 1, wherein the portion of the light transmitting plate through which light is allowed to be transmitted is sand blasted.

6. The radiation detection device according to claim 1, further comprising a changing unit for changing the distance between the sample holding unit and the light transmitting plate.

7. The radiation detection device according to claim 1, further comprising a vacuum chamber, wherein at least part of each of the irradiation unit, the detection unit and the illumination unit is disposed inside the vacuum chamber, the light transmitting plate is part of the wall of the vacuum chamber, and the sample holding unit is disposed outside the vacuum chamber.

* * * * *